(12) United States Patent
Tribble et al.

(10) Patent No.: US 10,574,443 B2
(45) Date of Patent: *Feb. 25, 2020

(54) SECURED COMMUNICATION IN NETWORK ENVIRONMENTS

(71) Applicant: Amazon Technologies, Inc., Seattle, WA (US)

(72) Inventors: Alexander Julian Tribble, Seattle, WA (US); Robert Michael Barry, Los Angeles, CA (US); Jeremy Boynes, Mercer Island, WA (US); Melissa Elaine Davis, Edmonds, WA (US); Igor Spac, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,113

(22) Filed: Feb. 16, 2016

(65) Prior Publication Data

US 2016/0173280 A1      Jun. 16, 2016

Related U.S. Application Data

(63) Continuation of application No. 14/158,636, filed on Jan. 17, 2014, now Pat. No. 9,270,449.

(51) Int. Cl.
*H04L 9/08* (2006.01)
*H04L 29/06* (2006.01)
*G06F 21/60* (2013.01)

(52) U.S. Cl.
CPC ............ *H04L 9/0827* (2013.01); *G06F 21/60* (2013.01); *G06F 21/606* (2013.01); *H04L 9/0838* (2013.01); *H04L 63/0435* (2013.01); *H04L 63/067* (2013.01); *H04L 2209/76* (2013.01)

(58) Field of Classification Search
None
See application file for complete search history.

(56) References Cited

U.S. PATENT DOCUMENTS

| | | | | |
|---|---|---|---|---|
| 7,146,505 | B1* | 12/2006 | Harada | ............... G06Q 20/206 705/18 |
| 7,853,782 | B1* | 12/2010 | Geddes | .................. G06F 21/33 705/78 |
| 8,745,394 | B1 | 6/2014 | Rahat | |
| 8,799,641 | B1* | 8/2014 | Seidenberg | ......... H04L 63/0876 713/153 |
| 8,856,869 | B1 | 10/2014 | Brinskelle | |
| 2004/0078593 | A1 | 4/2004 | Hind | |
| 2005/0223216 | A1 | 10/2005 | Chan | |

(Continued)

*Primary Examiner* — Madhuri R Herzog
(74) *Attorney, Agent, or Firm* — Davis Wright Tremaine LLP (57) ABSTRACT

A computing device can obtain a session key for encrypting data that is communicated between a client device and the computing device. The computing device can receive, from the client device, an encrypted request for data. The encrypted request can be encrypted by the client device using the session key. The data requested can be stored on a second computing device. The computing device can send, to the second computing device, a copy of the session key and the encrypted request for data. The second computing device can decrypt the data using the session key and can also encrypt data responsive to the request using the session key.

20 Claims, 8 Drawing Sheets (56) References Cited

U.S. PATENT DOCUMENTS

| | | |
|---|---|---|
| 2009/0132808 A1 | 5/2009 | Baentsch |
| 2009/0220080 A1* | 9/2009 | Herne .................. H04L 63/0428 380/255 |
| 2010/0299525 A1 | 11/2010 | Shah |
| 2011/0154019 A1* | 6/2011 | Wang .................. H04L 63/0281 713/153 |
| 2011/0296186 A1* | 12/2011 | Wong .................. H04L 63/0272 713/171 |
| 2013/0318347 A1 | 11/2013 | Moffat |

* cited by examiner

SECURED COMMUNICATION IN NETWORK ENVIRONMENTS

CROSS-REFERENCE TO RELATED APPLICATION

This application is a continuation of U.S. patent application Ser. No. 14/158,636, filed Jan. 17, 2014, entitled "SECURED COMMUNICATION IN NETWORK ENVIRONMENTS," the content of which is incorporated by reference herein in its entirety.

BACKGROUND

Transport Layer Security (TLS) and Secure Sockets Layer (SSL) provide cryptographic protocols that allow computing devices to securely communicate data over networks, e.g., the Internet. In one example, when establishing a secure communication channel, a client and a server can perform a handshake during which the client and the server exchange random numbers and a special number called the pre-master secret. These exchanged numbers can be combined with other data to generate a shared secret, i.e., the master secret, between the client and the server. The client and the server can then use the master secret to generate session keys.

The session keys are symmetric cryptographic keys that can be used to encrypt and decrypt data that is communicated between the client and the server through the secure communication channel. Thus, for example, once the session keys have been generated, the client can encrypt data to be sent to the server using the generated session key and, upon receiving the encrypted data, the server can use the generated session key to decrypt the encrypted data. Typically, a secure communication channel is needed to protect data being exchanged between the client and the server from being seen by third-party observers.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-described deficiencies and other deficiencies in conventional approaches to securing communication channels between computing devices. In particular, various embodiments of the present disclosure can provide approaches for providing end-to-end secure communication channels among computing devices.

End-to-end secure communication channels can be created to allow a client device to securely communicate data with multiple computing devices using one encryption key. For example, a client device can establish a session key with a web server for use in encrypting data that is communicated between the client device and the web server. In some instances, the client device may want to obtain data that is available at a data store that is accessible through the web server. In such instances, when an encrypted request for data that is in the data store is received, the web server can decrypt the request using the session key, and then re-encrypt the data request using a separate encryption key that is known to the web server and the data store.

During this process, the request is available on the web server in clear text and is therefore susceptible to being accessed by an unauthorized third-party. To remedy this vulnerability, the same session key that was established between the client device and the web server can be sent to the data store for using in encrypting data. Thus, when an encrypted data request for data that is in the data store is received, the web server can forward the data request directly to the data store and the data store can decrypt the request using the session key. The data store can then process the request to obtain data that is responsive to the request, encrypt the responsive data using the session key, and send the encrypted data back through the web server and to the client device.

As a result, the responsibility of performing a handshake, e.g., generating a session key using, for example, a Transport Layer Security or a Secure Sockets Layer cryptographic protocol, and the responsibility of encrypting and decrypting data can be compartmentalized. Different access rights can be set for the different differentially secure and precisely access controlled compartments to prevent unauthorized access to data. This compartmentalization is desirable for security reasons because it helps reduce the risk of systems being compromised and the risk of data being leaked. That is, no single compromise will affect other secure communication channels and an attacker would therefore have to devise multiple points of entry. Further, by restricting the handshake and the session key to one compartment, or, in some instances, one computing device, multiple sequential handshakes are no longer needed to communicate with other computing devices, since the same session key can be shared among the other computing devices. This feature can help reduce latency that results from having to perform multiple handshakes between computing devices. Additionally, some implementations allow a single session establishment for a one-to-many secure communication tunnel for multiple transactions.

Other advantages, variations, and functions are described and suggested below as may be provided in accordance with the various embodiments.

Figure 1:
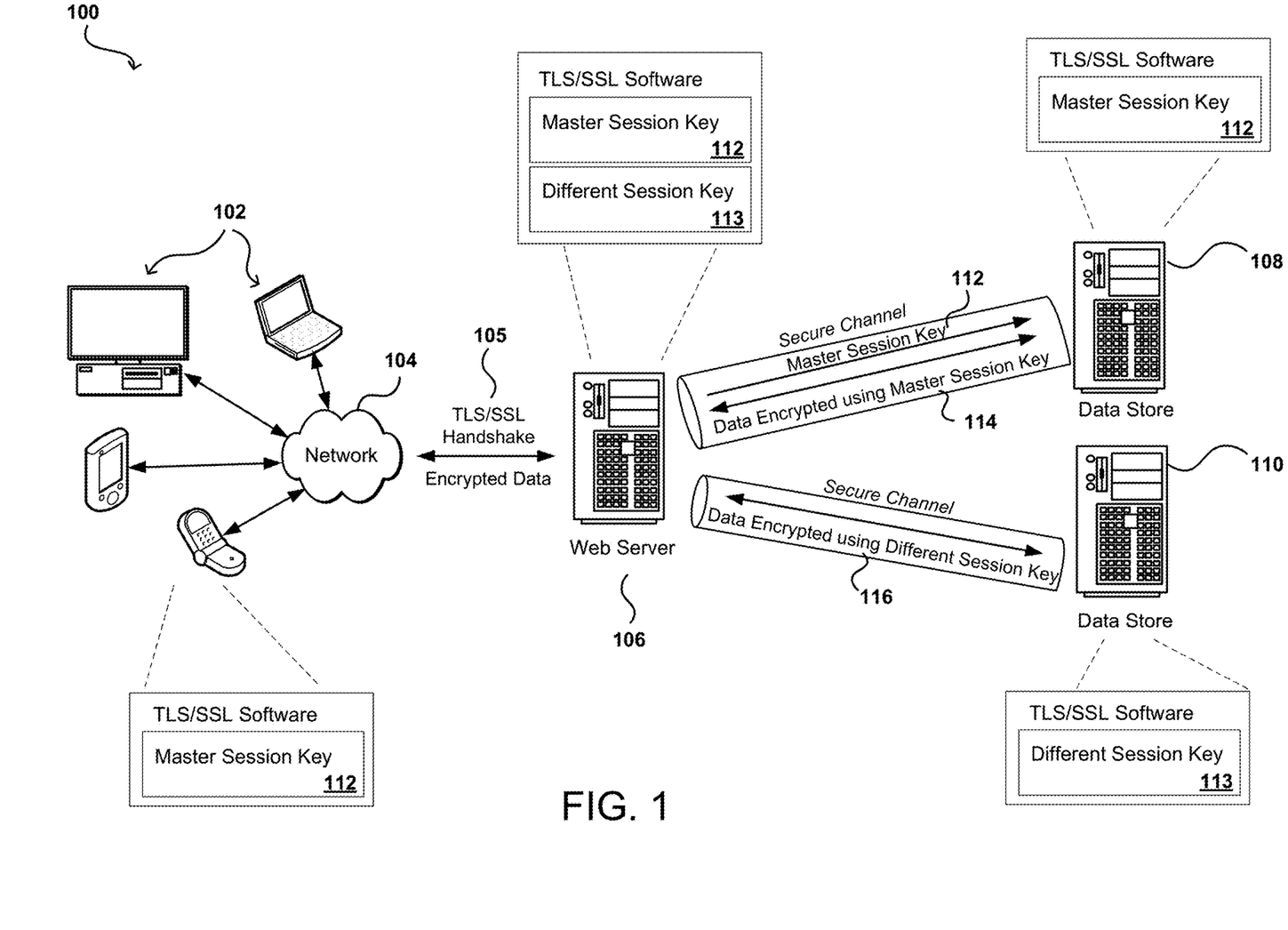
FIG. 1 illustrates an example diagram showing an end-to-end secure communication channel between computing devices.

FIG. 1 illustrates an example diagram 100 showing an end-to-end secure communication channel between computing devices 102, 106, and 108. In FIG. 1, a user interacting with a computing device 102, i.e., a client, through a software application executing on the computing device 102, to access, over a network 104, a secure website that is hosted by the computing device 106, i.e., a web server.

Typically, before accessing the secure website, the client 102 and the web server 106 will establish a secure communication channel among themselves. A secure communication channel can be established by performing a handshake 105 using generally known cryptographic protocols, e.g., Transport Layer Security (TLS) or Secure Sockets Layer (SSL).

For example, an example TLS handshake 105 can involve the client 102 sending to the web server 106 data describing a generated random number value and a list of cipher suites that are supported by the computing device 102. The web server 106 responds by sending the client 102 a generated random number value and a security certificate, e.g., an X.509 security certificate, that includes the web server's public key. The client 102 generates a random pre-master secret, encrypts the pre-master secret using the web server's public key, and sends, to the web server 106, the encrypted pre-master secret. The web server 106 receives and decrypts the pre-master secret using the web server's private key.

Next, the client 102 and the web server 106 each use the pre-master secret to generate a master secret and a session key 112 ("master session key"). The master session key 112 can be used to encrypt and decrypt data that is communicated between the client 102 and the web server 106. Data that is communicated over the secure communication channel is encrypted and is therefore not able to be accessed by a third-party, as it typically would be had the data been communicated in clear text.

The client 102 and the web server 106 can securely communicate data over the secure communication channel by sending data that has been encrypted using the master session key 112. For example, the client 102 can send, over the secure communication channel, an encrypted request to the web server 106 for data that is stored in a data store 110. The request can be encrypted using the master session key 112 that was established between the client 202 and the web server 106. After receiving the encrypted request, the web server 106 can decrypt the request using the master session key 112 and can then process the request to obtain data from the data store 110. When obtaining data from the data store 110, the web server 106 and the data store 110 can establish a different session key 113, for example, using the handshake described above, to be used for encrypting and decrypting data that is communicated between the web server 106 and the data store 110.

As a result, the web server 106 and the data store 110 exchange data 116 that is encrypted using the different session key 113 while the web server 106 and the client 102 exchange data that is encrypted using the master session key 112. Thus, the web server 106 is tasked with decrypting the request that is received from the client 102 using the master session key 112, and then re-encrypting the request using the different session key 113 before sending the request to the data store 110. Similarly, the web server 102 is tasked with decrypting data that is received from the data store 110 using the different session key 113, and then re-encrypting the data using the master session key 112 before sending the request to the client 102. Generally, this means that data that is received from the client 102 or from the data store 110 is, at some point, available on the web server 106 in clear text. Consequently, when available in clear text, this data is susceptible to being accessed by an unauthorized third-party that has access to the web server 106.

In some embodiments, the web server 106 creates an end-to-end secure communication channel between the client 102 and other computing devices, e.g., the data store 108, that store data that is being requested by the client 102. In such embodiments, the master session key 112 that is established between the client 102 and the web server 106, for example, using the handshake described above, is sent by the web server 106 to the data store 108. The data store 108 can use the master session key 112 to encrypt data 114 that is communicated between the web server 106 and the data store 108. In some embodiments, the web server 106 first encrypts the master session key 112, for example, using the data store's 108 public key, before sending it to the data store 108. Other ways of encrypting the master session key 112 are possible using generally known encrypting techniques. Upon receipt, the data store 108 can decrypt the master session key 112 using the data store's 108 private key and can then begin encrypting data using the master session key 112.

Further, the web server 106 is no longer tasked with decrypting data that is received from the data store 110 using a different session key 113, and then re-encrypting that data using the master session key 112. Instead, the data store 110 encrypts the data using the master session key 112 and sends the encrypted data 114 to the web server 106. The web server 106 simply sends the encrypted data 105 to the client 102, and the client 102 can decrypt the data using the master session key 112. Thus, in such embodiments, data that is received from the client 102 or from the data store 110 is no longer decrypted in the web server 106 and, as a result, is also not available in clear text in the web server 106. In some embodiments, the web server 106 is restricted to sending copies of the master session key 112 to other computing devices, e.g., the data store 108, and cannot use the master session key 112 to decrypt data.

Figure 2:
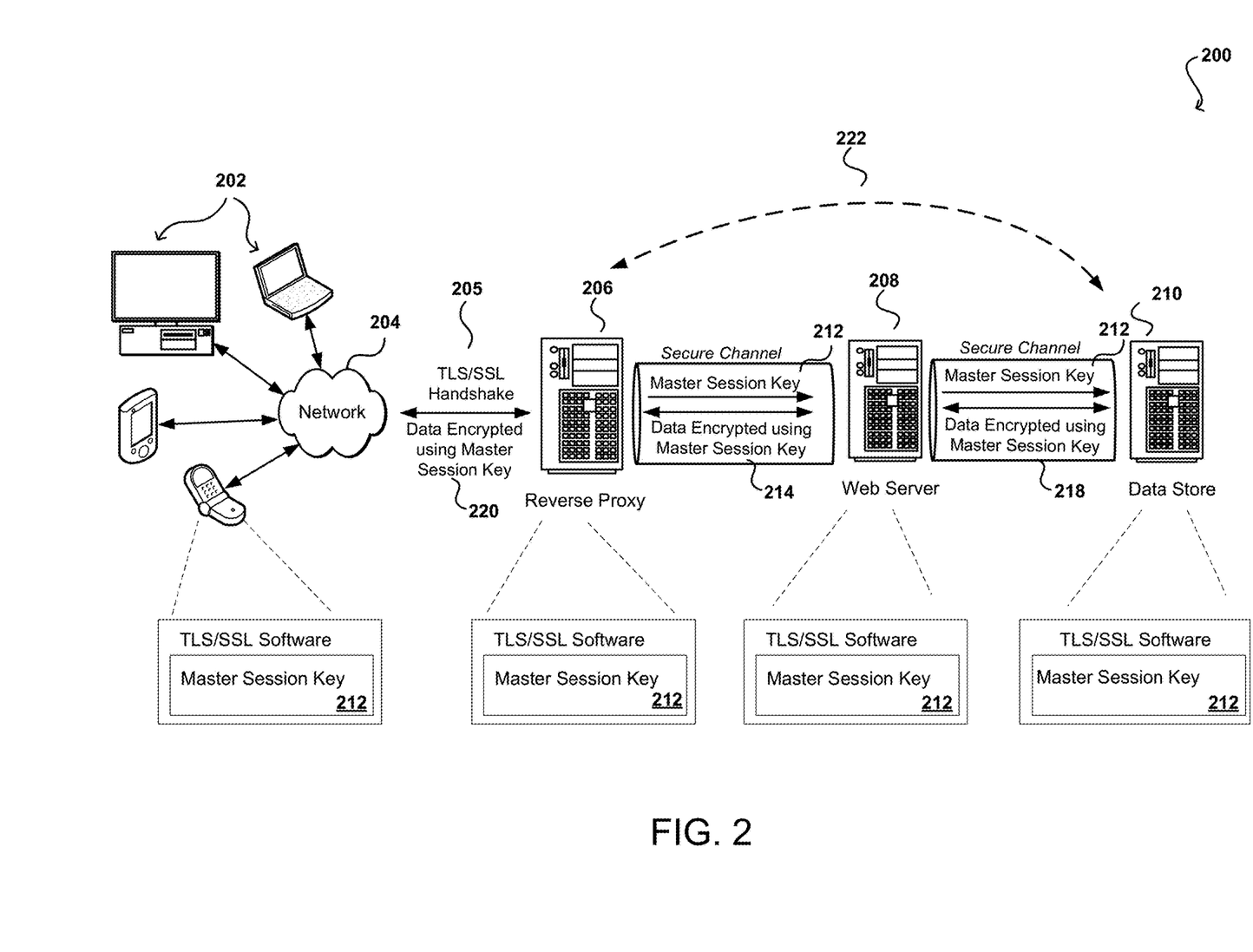
FIG. 2 illustrates another example diagram showing an end-to-end secure communication channel between computing devices.

FIG. 2 illustrates another example diagram 200 showing an end-to-end secure communication channel between computing devices 202, 206, 208, and 210. In FIG. 2, a user interacting with a computing device 202, i.e., a client, through a software application executing on the computing device 202, to access, over a network 204, a secure website that is hosted by the computing device 208, i.e., a web server. The web server 208 is located behind the computing device 206, i.e., a reverse proxy.

Typically, before accessing the secure website, the client 202 and the reverse proxy 206 will establish a secure communication channel among themselves. A secure communication channel can be established by performing a handshake 205 using generally known cryptographic protocols, e.g., Transport Layer Security (TLS) or Secure Sockets Layer (SSL), as described above.

The client 202 and the reverse proxy 206 can securely communicate data over the secure communication channel by sending data that has been encrypted using the master session key 212 that was generated as a result of the handshake 205. The reverse proxy 206 can also serve as an intermediary for facilitating communication between the client 202 and the web server 208 or the data store 210.

For example, the client 202 can send, through the reverse proxy 206, an encrypted request 220 for data that is stored in a data store 110. The request 220 can be encrypted using the master session key 212 that was established between the client 202 and the reverse proxy 206.

After receiving the encrypted request 220, the reverse proxy 206 can decrypt the request using the master session key 212. Typically, the reverse proxy 206 can then communicate with the web server 208 to generate a second session key, for example, using the cryptographic protocols described above, to be used for encrypting data that is communicated between the reverse proxy 206 and the web server 208. The reverse proxy 206 can encrypt the request received from the client 202 using the second session key and can send the request to the web server 208 for processing.

In some embodiments, however, the reverse proxy 206 sends a copy of the master session key 212 to the web server 208 for using in encrypting data that is communicated between the reverse proxy 206 and the web server 208. Optionally, the reverse proxy 206 can encrypt the master session key 212, for example, using the web server's 208 public key before sending to provide added security for the master session key 212. Other ways of encrypting the master session key 212 are possible using generally known encrypting techniques.

Upon receipt, the web server 208 can decrypt the master session key 212 using the web server's 208 private key and can then begin encrypting data using the master session key 212. In such embodiments, the reverse proxy 206 can send 214 the encrypted request to the web server 208 for processing.

The web server 208 can decrypt the request 214 using the master session key 212 and can evaluate the request 214. The web server 208 can obtain data responsive to the request and can encrypt the obtained data using the master session key 212. The web server 208 can send the encrypted data back to the reverse proxy 206, which then sends the encrypted data to the client 202 for decrypting.

In some instances, to process the request 214, the web server 208 may need to communicate with the data store 210 to obtain data. Typically, when accessing the data store 210, the web server 208 can communicate with the data store 210 to generate a third session key, for example, using the cryptographic protocols described above, to be used for encrypting data that is communicated between the web server 208 and the data store 210.

To avoid having to generate multiple session keys, in some embodiments, the web server 208 sends a copy of the master session key 212 to the data store 210 for using in encrypting data that is communicated between the web server 208 and the data store 210. Optionally, the web server 208 can encrypt the master session key 212, for example, using the data store's 210 public key, before sending to provide added security for the master session key 212. Other ways of encrypting the master session key 212 are possible using generally known encrypting techniques.

Upon receipt, the data store 210 can decrypt the master session key 212 using the data store's 210 private key and can then process the request. The data store 210 can encrypt data responsive to the request using the master session key 212 and can send the encrypted data 218 to the web server 208. The web server 208 can send the data 218 that was encrypted by the data store 210 using the master session key 212 back to the reverse proxy 206. In other words, data that is received from the data store 210 is no longer decrypted in the web server 208 and, as a result, is also not available in clear text in the web server 208.

Further, the reverse proxy 206 is no longer tasked with decrypting data that is received from the web server 208, or the data store 210, using different session keys, and then re-encrypting that data using the master session key 212 before sending that data to the client 202. Instead, the reverse proxy 206 simply sends, to the client 202, data that was encrypted by the web server 208, or the data store 210, using the master session key 212. The client 202 can decrypt the data using the master session key 212. Thus, data that is received from the client 202, the web server 208, or from the data store 210 is no longer decrypted in the reverse proxy 206 and, as a result, is also not available in clear text in the reverse proxy 206. In some embodiments, the reverse proxy 206 is restricted to sending copies of the master session key 112 to other computing devices, e.g., the data store 210, and cannot use the master session key 112 to decrypt data.

By handing off the master session key 212 to multiple computing devices, as described above, an end-to-end secure communication channel can be established between the client 202 and other computing devices, e.g., the data store 210, that store data that is being requested by the client 202.

In some embodiments, when the client 202 sends an encrypted request, which was encrypted using the master session key 212, for data that is stored on the data store 210, the reverse proxy 206 sends 222 a copy of the master session key 212 along with the encrypted request directly to the data store 210 while bypassing the web server 208. As a result, the web server 208 is isolated from the process of sharing the master session key 212. In such embodiments, the reverse proxy 206 can encrypt the master session key 212, for example, using the data store's 210 public key, before sending to provide added security for the master session key 212. Other ways of encrypting the master session key 212 are possible using generally known encrypting techniques.

In some embodiments, when the client 202 sends an encrypted request, which was encrypted using the master session key 212, for data that is stored on the data store 210, the reverse proxy 206 sends 222 a copy of the master session key 212 along with the encrypted request directly to the data store 210 while bypassing the web server 208. In such embodiments, the data stream being send by the web server 208 may contain a mixture of encrypted and unencrypted data. For example, the encrypted data can be the data forwarding from the web server's interactions with the data store 210, as described above. The web server 208 can send this encrypted data along with its own unencrypted data to the reverse proxy 206. The reverse proxy 206 can use the master session key 212 to encrypt the data stream being sent by the web server 208 that contains the mixture of encrypted and unencrypted data. As a result, the client device 202 receives, from the reverse proxy 206, an encrypted data stream that includes the mixture of encrypted and unencrypted data.

In some embodiments, a separate computing device, for example, a Hardware Security Module (HSM), can be used to perform the handshake, e.g., the TLS/SSL handshake, with the client 202, and to generate the master session key 212, as described above. In such embodiments, the HSM can be configured to send a copy of the master session key 212 directly to other relevant computing devices, e.g., the data store 210, while bypassing the reverse proxy 206 and the web server 208 entirely. The HSM can encrypt the session key, for example, using the data store's public key, prior to sending. As a result, the reverse proxy 206 and the web server 208 do not have a copy of the master session key 212 with which they can decrypt data that is sent from the data store 210 to the client 202 through the web server 208 or the reverse proxy 206. In some embodiments, the HSM is restricted to sending copies of the master session key 212 to other computing devices, e.g., the data store 210, and cannot use the master session key 212 to decrypt data.

Figure 3:
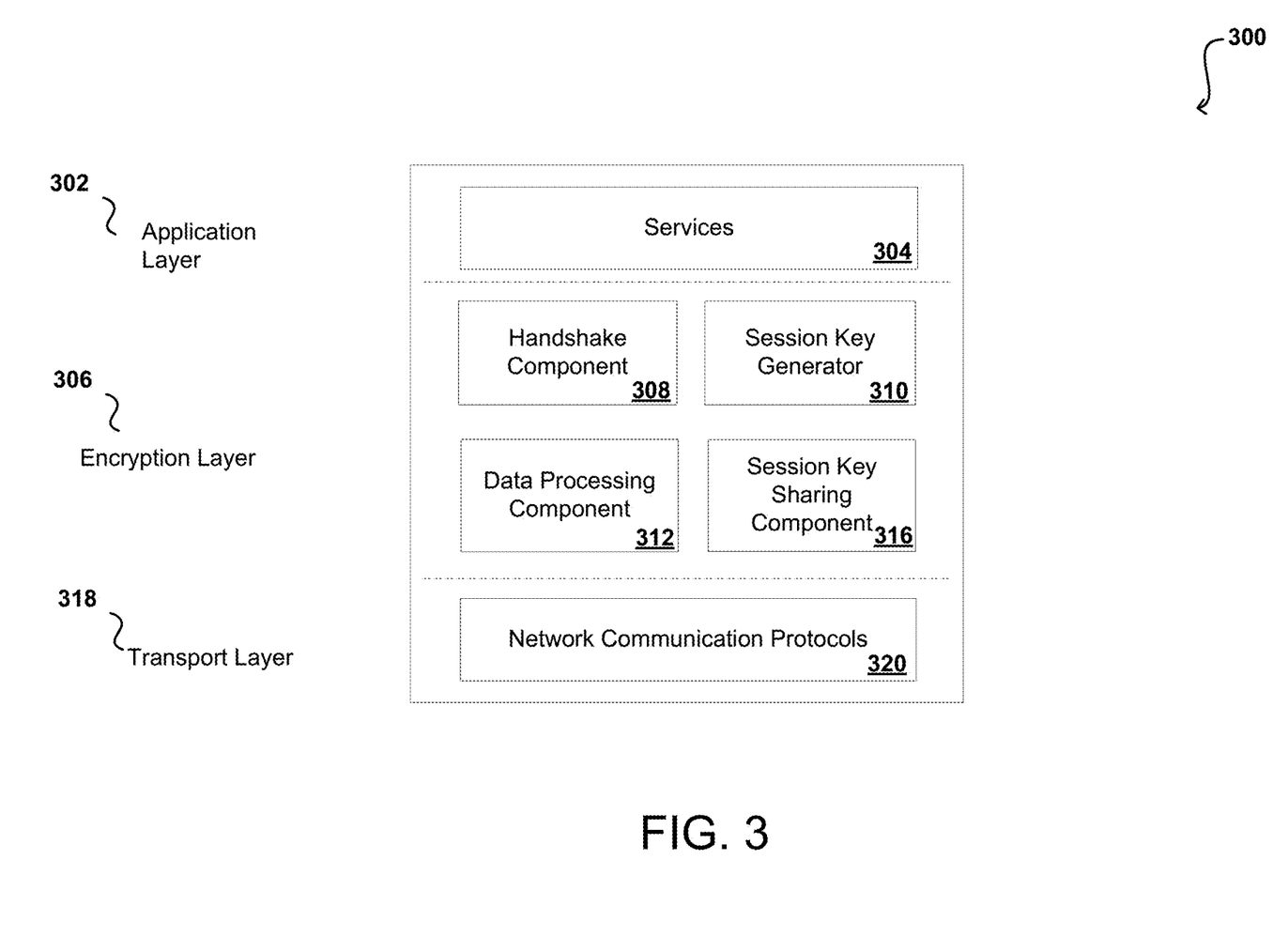
FIG. 3 is an example protocol stack for implementing an end-to-end secure communication channel between computing devices.

FIG. 3 is an example protocol stack 300 for implementing an end-to-end secure communication channel between computing devices. For example, the protocol stack 300 can be implemented in a computing device, e.g., the computing device 208, described above in reference to FIG. 2. The protocol stack 300 can be used to allow creation of an end-to-end secure communication channel between computing devices, for example, by permitting copies of a session key to be sent to multiple computing devices. At least some of the components, e.g., the application layer 302 and the TLS/SSL layer 306, can be implemented within secure compartments, as described above. Although the protocol stack is described as implementing Transport Layer Security or Secure Sockets Layer, other protocols may be used depending on the implementation including, for example, Datagram TLS (DTLS). Further, depending on the protocol implemented, further changes to the protocol stack may be implemented as needed.

The protocol stack 300 is configured to encrypt data that is sent over a network, e.g., the Internet, between a first computing device and a second computing device. Data that is generated by services 304, e.g., HTTPS (HyperText Transfer Protocol Secure), that are operating at the application layer 302 can be encrypted, for example, using Transport Layer Security (TLS) or Secure Sockets Layer (SSL) at the TLS/SSL layer 306. The TLS/SSL layer 306 can be layered between the application layer 302 and the transport layer 318 so that application data can be encrypted before being sent to the transport layer 318. The transport layer 318 can employ various network communication protocols 320, e.g., TCP/IP, to send and receive data to and from other computing devices.

The TLS/SSL layer 306 can include a handshake component 308 that is configured to perform a handshake, e.g., a TLS/SSL handshake, with other computing devices, as described above. The TLS/SSL layer 306 also includes a session key generator 310 that is configured to generate session keys to be used for encrypting data, as described above. The TLS/SSL layer 306 also includes a data processing component 312 that can receive and encrypt data from the application layer 302 and send the encrypted data to the transport layer 318. The data processing component 312 can encrypt and decrypt data using, for example, a session key that was established between a first and second computing device using the handshake component 308. In some embodiments, the TLS/SSL layer 306 includes a session key sharing component 316 that is configured to send copies of session keys to other computing devices, as described above in reference to FIGS. 1, 2, 5, and 6.

In some embodiments, access rights can be specified that define a level of access to session keys with respect to the handshake component 308, the session key generator 310, the data processing component 312, or the session key sharing component 316. For example, a computing device can be configured so that it can access a particular session key using the session key sharing component 316 but not using the data processing component 312. That is, the computing device can be configured to share the particular session key with other computing devices but not to decrypt data using the particular session key.

Figure 4:
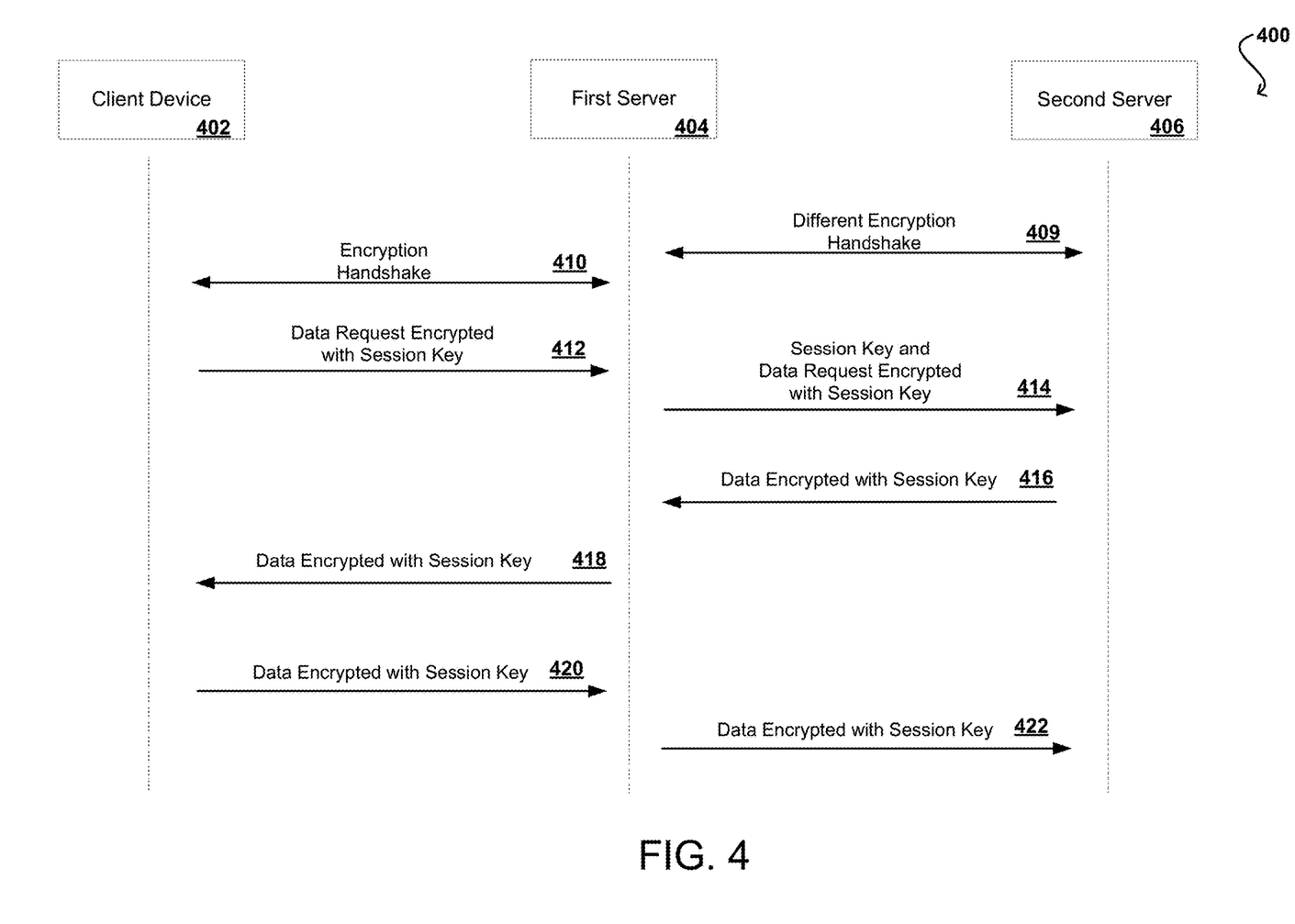
FIG. 4 illustrates an example sequence diagram showing communication between computing devices over an end-to-end secure communication channel.

FIG. 4 illustrates an example sequence diagram 400 showing communication between computing devices over an end-to-end secure communication channel. The diagram 400 shows interaction between a client device 402, a first server 404, and a second server 406.

The client device 402 and the first server 404 can perform an encryption handshake 410, e.g., TLS/SSL or a different encryption technique, to establish a secure communication channel through which encrypted data will be communicated, as described above. When performing the handshake 410, the client device 402 and the first server 404 will each generate a session key for encrypting data, as described above.

The client device 402 can send the first server 404 a request 412 for data that is stored on the second server 406. The request can be encrypted using the session key that was generated during the handshake 410. In this example, the second server 406 is not directly accessible to the client device 402, but can be accessed by the first server 404. Thus, the first server 404 will need to send the request 412 to the second server 406 for processing. In some embodiments, the first server 404 sends, to the second server 406, a copy of the session key, together with the request 412 that was sent by the client device 414. The copy of the session key, together with the request 412 is sent from the first server 404 to the second server 406 over a different secure communication channel that is established between the first server 404 and the second server 406. That is, a different encryption handshake 409 is performed between the first server 404 and the second server 406 before the session key and request are sent from the first server 404 to the second server 406. In particular, the session key sent to the second server 406 is the same session key that was generated by the client device 402 and the first server 404 during the handshake 410. The first server 404 can encrypt the session key before sending to the second server 406 using, for example, the second server's 406 public key. In some embodiments, the first server 404 is restricted to sending copies of the master session key 112 to other computing devices, e.g., the second server 406, and cannot use the master session key 112 to decrypt data.

The second server 406 can decrypt the request 412 using the session key. After processing the request 412, the second server 406 can encrypt data responsive to the request 412 using the session key, and can send the encrypted data back to the first server 416. The first server 404 can send the encrypted data to the client device 418. The client device 402 can decrypt the data using the session key to view its contents. As a result, an end-to-end secure communication channel is established between the client device 402 and the second server 406. In other words, the first server 404 no longer needs to decrypt data that is received from the second server 406, for example, using a separate encryption key that was established between the first server 404 and the second server 406, and then re-encrypt the data using the session key before sending the data to the client device 402.

Figure 5:
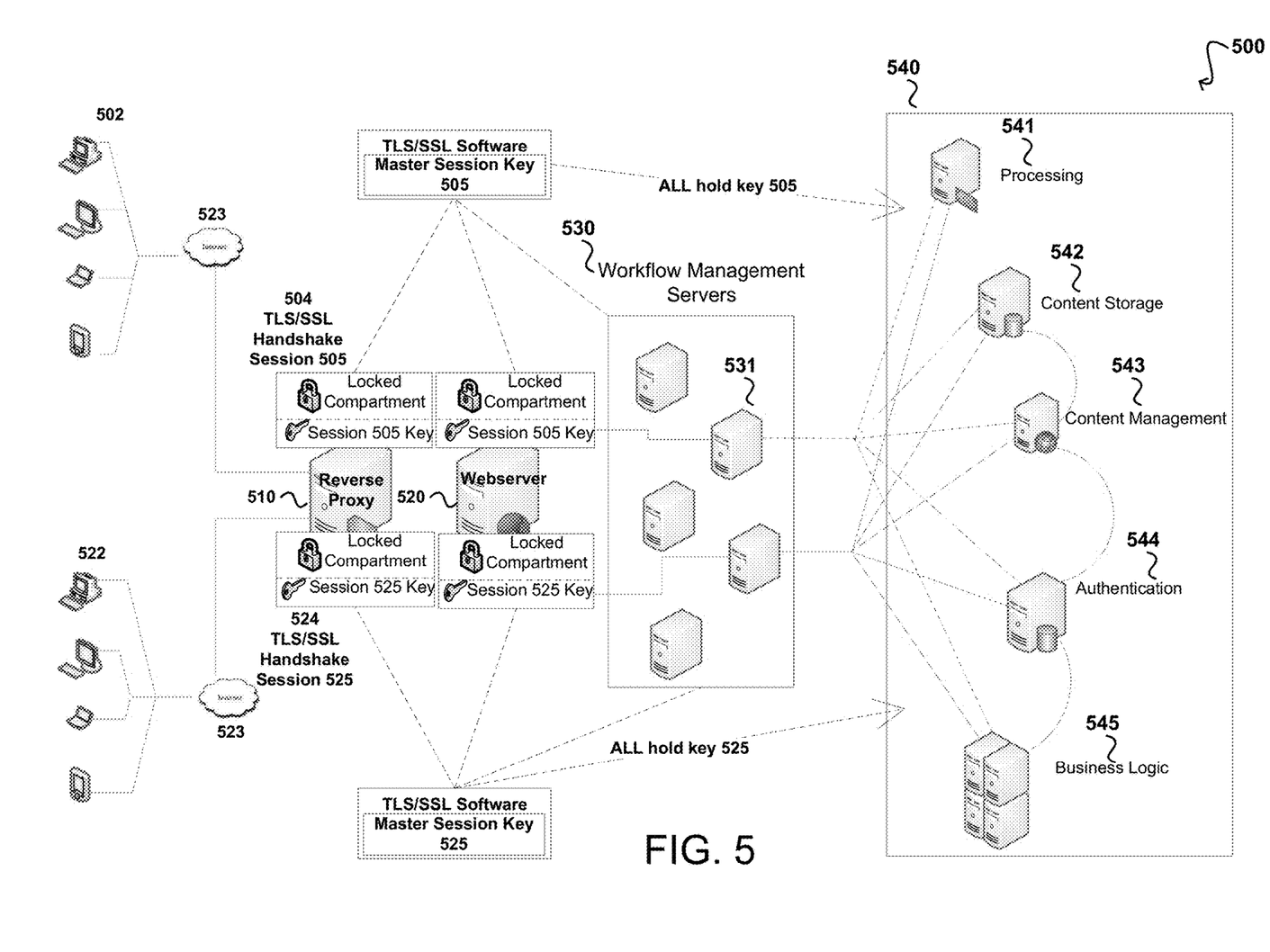
FIG. 5 illustrates an example diagram showing a distributed compute environment allowing parallelization of end-to-end secure communication channels between computing devices.

FIG. 5 illustrates an example diagram 500 showing a distributed compute environment allowing parallelization of end-to-end secure communication channels between computing devices 502, 510, 530, and 540. In FIG. 5, a user interacting with a computing device 502, i.e., a client, through a software application executing on the computing device 502, to access, over a network 523, a secure website that is hosted by the computing device 520, i.e., a web server. The web server 520 is located behind the computing device 510, i.e., a reverse proxy. The environment includes workflow servers 530, e.g., the workflow server 531. The user device 502 can perform an encryption handshake, e.g., a TLS/SSL handshake, with the reverse proxy 510. Separate individual encryption handshakes, e.g., TLS/SSL handshakes, can be performed between each workflow server, e.g., the workflow server 531, and each backend system 541, 542, 543, 544, and 545. That is, each separate session that results from a handshake is associated with a separate encryption key, and each encryption key is associated with a key identifier that can be used to identify that key's corresponding session.

The distributed compute environment is organized as a Service Oriented Architecture (SOA) that includes several backend systems 541, 542, 543, 544, and 545 that may be involved in servicing a request submitted by the user. Each backend systems 541, 542, 543, 544, and 545 can each perform a different function that is needed to process requests. For example, the system 541 can be configured to process a fee associated with a user request, the system 542 can store content that can be provided in response to a user request, the system 543 can manage content rights, e.g., whether a particular user can or cannot access particular content, the system 544 can authenticate the user that is sending a request for content, and the system 545 can be configured to validate the user request in miscellaneous ways. The SOA architecture is configured to allow parallelization in gathering data and transporting data over secure links, for example, to the computing device 502, using the master session key 505 that was established between the computing device 502 and the computing device 510.

Data collected from the backend systems 541, 542, 543, 544, and 545 can be assembled by an intermediary server, e.g., the workflow server 531. In such instances, the intermediary server, e.g., the workflow server 531, would have access to the master session key 505 so that the server 531 is able to encrypt the data using the master session key 505 and forward the encrypted data, for example, to the reverse proxy 510, to send to the computing device 502. Depending on the implementation, access to a master session key 505 can key can be restricted to those systems that are involved in the assembling of data, e.g., the workflow server 531. That is, in such implementations, the webserver 520 and the backend systems 540 can be restricted from having access to the master session key 505.

For example, in FIG. 5, the back-end services 541, 542, 543, 544, and 545 can communicate each other and return data to the work flow servers 530, e.g., the work flow server 531. The work flow server 531 can assemble the data received from the back-end services and form the reply or notification that the work flow has either completed successfully or failed. The servers in the distributed architecture implement the secure compartmentalization, for example, as described in reference to FIG. 3, such that multiple requests are handled and processed over an indefinite number of servers all implementing the secure compartmentalization and binding transactions to the Session ID, e.g., the one corresponding to the computing device 502 and encrypting with the master session key 505 for that request/session identifier. A similar approach would be applied for a different computing device 522 that is accessing the SOA. That is, the SOA architecture is configured to allow parallelization in gathering data and transporting data over secure links to the computing device 522, using the master session key 525 that was established between the computing device 522 and the computing device 510.

In some implementations, the intermediary server, e.g., the workflow server 531, is configured to send the master session key 505 to at least one of the backend systems 541, 542, 543, 544, and 545, for use in encrypting data that is sent back to the intermediary server, depending on which backend server is needed to process the request. In some implementations, the workflow server 531 includes a combiner that is configured to combine data that is received from the multiple backend systems 541, 542, 543, 544, and 545, as described in reference to FIG. 6.

Figure 6:
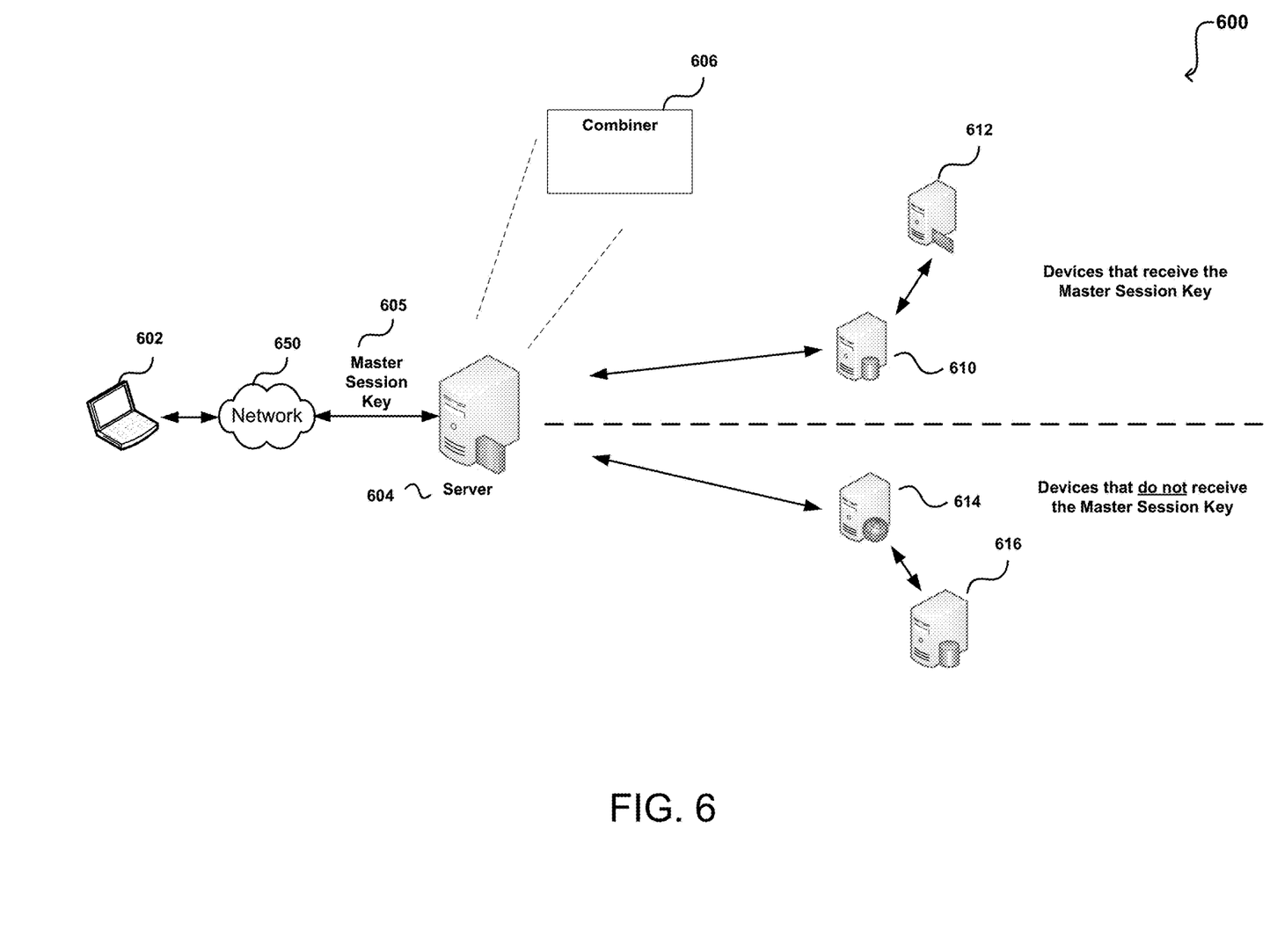
FIG. 6 illustrates an example diagram showing a distributed compute environment with a server that implements a combiner.

FIG. 6 illustrates an example diagram 600 showing a distributed compute environment with a server 604 that implements a combiner 606 that is configured to combine data that is received from the multiple backend systems 610, 612, 614, and 616. For example, in some instances, the server 604 may be configured to send a master session key 605 that was generated between a handshake between the computing device 602 and the server 604. The server 604 can send the master session key 605 to some, but not all, of the backend systems. In such instances, the server 604 is configured to combine data that is received from the backend systems, some of which may be encrypted using the master session key 605 and some which may not, and forward the combined data to be sent to the computing device 602. When combining the data, the server 604 can encrypt, using the master session key 605, the data received from the backend systems, whether it was encrypted by the master session key 605 or not, so that the data stream sent to the computing device 602 is all encrypted using the master session key 605.

In some implementations, there may be multiple ongoing sessions between user devices and the server 604 that each have a respective master session keys that was established during a handshake with the server 604. In such instances, the combiner 606 can be implemented to use key identification and key management techniques to determine which master session key to use in combining and encrypted a data stream for a particular user device. In some implementations, a metadata string that is bound to the master session key and the session itself can be used to distinguish between keys. For example, in TLS/SSL, this string is called the SessionID which describes the key and other elements of the transaction. Thus, in some implementations, the master session key includes the actual key used for encryption and decryption, together with a session identifier as metadata for use in identifying the key to all of computing devices involved. In such instances, the computing system sending an encrypted data stream can identify the encrypted data using the session identifier. Similarly, systems on either end of a transaction can use the session identifier to identify the session and unequivocally identify the correct key for that session.

Figure 7:
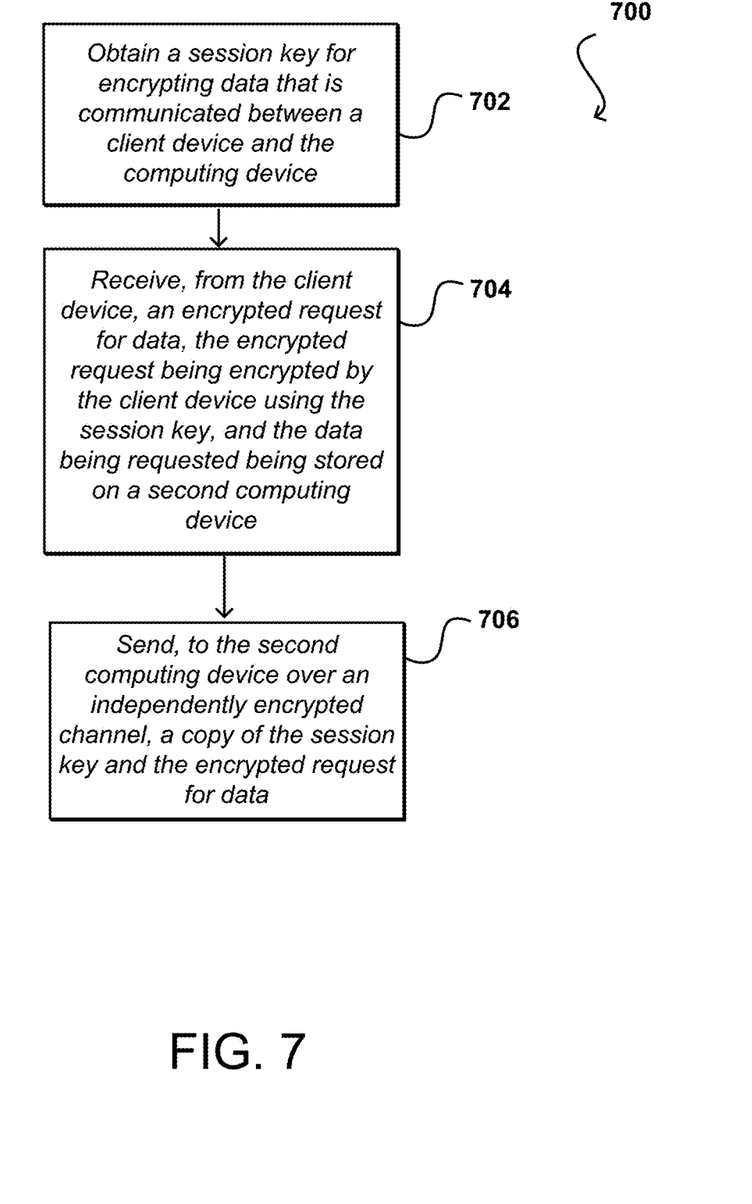
FIG. 7 is a flow diagram of an example process for implementing an end-to-end secure communication channel between computing devices.

FIG. 7 is a flow diagram of an example process 700 for implementing an end-to-end secure communication channel between computing devices. The example process 700 is provided merely as an example and additional or fewer steps may be performed in similar or alternative orders, or in parallel, within the scope of the various embodiments described in this specification.

A computing device generates a session key for encrypting data that is communicated between a client device and the computing device 702. The computing device receives, from the client device, an encrypted request for data 704. The encrypted request can be encrypted by the client device using a separately generated copy of the session key. Further, in this example, the data being requested can be stored on a second computing device.

The computing device sends, to the second computing device, a copy of the session key and the encrypted request for data 706. The second computing device can decrypt the request for data using the session key and can obtain data that is responsive to the request. The second computing device can then encrypt the obtained data using the session key and can send the encrypted data back to the computing device.

Once received, the computing device can send the data encrypted using the session key to the client device. The client device can then decrypt the data using the session key that was independently generated on the client device and can view the contents of the data. In some embodiments, the computing device is restricted to sending copies of the session key to other computing devices, e.g., the second computing device, and cannot use the session key to decrypt data.

Figure 8:
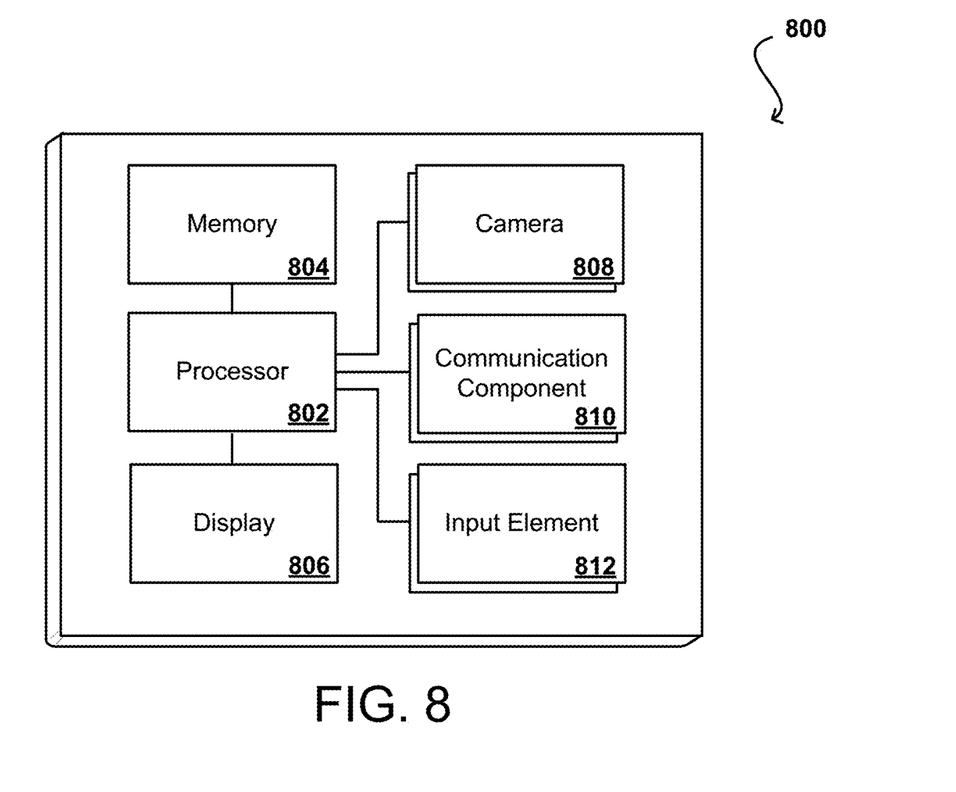
FIG. 8 illustrates an example logical arrangement of a set of general components of an example computing device.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
    performing a handshake between a client device and a first computing device to generate:
        a session key for encrypting data that is communicated between the client device and the first computing device; and
        an access controlled compartment, the access controlled compartment associated with access rights preventing the first computing device from performing cryptographic operations using the session key;
    receiving, within the access controlled compartment and from the client device, a request for data, wherein the request for data is encrypted using the session key;
    sending, from the first computing device to a second computing device, a copy of the session key and the request for data;
    receiving, at the first computing device, from the second computing device, the data encrypted with the session key, access rights for the first computing device preventing decryption of the data; and
    making the encrypted data available to the client device in response to the request.

2. The computer-implemented method of claim 1, wherein obtaining the session key at the first computing device further comprises:
    performing, with the client device, a cryptographic protocol handshake; and
    generating, in response to performing the cryptographic protocol handshake, the session key.

3. The computer-implemented method of claim 1, further comprising:
    receiving, from the client device, a different encrypted request for different data, the different encrypted request encrypted with the session key, and wherein the different data is stored on a third computing device that is accessible to the first computing device;
    sending, to the third computing device, a copy of the session key and the different encrypted request;
    receiving, from the third computing device, the different data, the different data encrypted by the third computing device using the session key; and
    sending, to the client device, the different data that is responsive to the different request,
    wherein the client device is able to decrypt, using the session key, the different data.

4. The computer-implemented method of claim 1, wherein sending, from the first computing device to the second computing device, a copy of the session key and the information that identifies data responsive to the request further comprises:
    obtaining a public key associated with the second computing device;
    encrypting the session key using the public key associated with the second computing device; and
    sending, to the second computing device, the session key encrypted using the public key associated with the second computing device,
    wherein the second computing device is able to decrypt the session key using a private key associated with the second computing device.

5. The computer-implemented method of claim 1, wherein:
the first computing device is limited to providing the session key to the second computing device; and
the first computing device does not decrypt the data responsive to the request.

6. A system comprising:
one or more processors; and
memory storing instructions that, upon execution by the one or more processors, cause the system:
perform a handshake between a client device and a first computing device to generate:
a session key associated with a communication session between the client device and the first computing device; and
an access controlled compartment, the access controlled compartment associated with access rights preventing the first computing device from performing cryptographic operations using the session key;
send a request from the client device, to the access controlled compartment, wherein the request is encrypted using the session key;
provide, from the access controlled compartment to a second computing device, the session key and the request;
receive, in response to the request, by the access controlled compartment, from the second computing device, using a different encryption handshake between the first computing device and the second computing device, encrypted data encrypted with the session key, access rights on the first computing device prohibiting the encrypted data to be decrypted using the session key; and
provide the encrypted data to the client device, from the access controlled compartment.

7. The system of claim 6, wherein the session key and the request are provided to the second computing device by at least sending the session key and the request to the second computing device via a secure communication channel, the secure communication channel using a different session key.

8. The system of claim 6, wherein the operations further comprise:
receiving, from the client device, a different request for different data, the different request encrypted with the session key, a fourth computing device able to send data to the computing device via a third computing device; and
sending, to the fourth computing device, a copy of the session key and the different request for data.

9. The system of claim 8, wherein:
the session key and the request for data are not sent to the fourth computing device via the third computing device; and
the different request is encrypted with the session key.

10. The system of claim 8, wherein the operations further comprise:
receiving, from the third computing device, in response to the different request, different encrypted data provided by the fourth computing device, the different encrypted data encrypted with the session key; and
sending, to the client device, the different encrypted data, wherein the third computing device does not have access to the session key.

11. The system of claim 6, wherein the first computing device does not decrypt the data responsive to the request.

12. The system of claim 6, wherein obtaining the session key associated with the communication session between the client device and the first computing device further comprises:
performing, with the client device, a handshake associated with establishment of the communication session; and
generating, as a result of performing the handshake, the session key.

13. The system of claim 12, wherein the first computing device includes:
a first module that performs the handshake, and negotiates the session key in coordination with the client device;
a second module that encrypts and decrypts data using the session key; and
a third module that causes the session key to be available to another computing device.

14. The system of claim 13, wherein the first module, the second module, and the third module are able to have different permissions to access the session key.

15. The system of claim 13, wherein the second computing device is able to encrypt and decrypt data using the session key.

16. The system of claim 6, wherein providing, to the second computing device, the session key and the request further comprises:
obtaining a public key associated with the second computing device;
encrypting the session key using the public key associated with the second computing device to produce an encrypted session key; and
sending, to the second computing device, the encrypted session key,
wherein a private key associated with the second computing device is accessible to the second computing device.

17. A non-transitory computer-readable storage medium comprising executable instructions that, upon execution by one or more processors of a computing system, cause the computing system to at least:
receive, from a first computing device, a session key and a request, the request encrypted with the session key, the session key established as a result of a negotiation between a client device and the first computing device, the request stored on the first computing device within an access controlled compartment, the access controlled compartment associated with access rights preventing the first computing device from performing cryptographic operations using the session key;
decrypt the request using the session key;
process the request to obtain data that is responsive to the request;
encrypt, using the session key, the data to produce encrypted data; and
relay, through the first computing device, the encrypted data to the client device, wherein access rights for the first computing device prevent decryption of the encrypted data on the first computing device.

18. The non-transitory computer-readable storage medium of claim 17, wherein:
the session key is encrypted using a public key associated with the computing device; and
the executable instructions, as a result of being executed by the one or more processors of the computing device, further cause the computing device to decrypt the session key using a private key associated with the computing device.

19. The non-transitory computer-readable storage medium of claim 17, wherein the session key is established between the client device and the first computing device as a result of a key exchange algorithm performed by the client device and the first computing device.

20. The non-transitory computer-readable storage medium of claim 17, wherein the executable instructions, as a result of being executed by the one or more processors of the computing device, further cause the computing device to:
- receive, from the first computing device, a different request;
- send, to a second computing device and over a different communication channel between the computing device and a second computing device, a copy of the session key and the different request;
- receive, from the second computing device and over the different communication channel, different encrypted data that is responsive to the different request, the different encrypted data encrypted using the session key; and
- send, to the first computing device and over the communication channel, the different encrypted data.

\* \* \* \* \*